Jan. 18, 1938.　　　LE ROY J. LINDBERG　　　2,106,120
HIGH FREQUENCY APPARATUS
Filed April 14, 1937　　　3 Sheets-Sheet 1
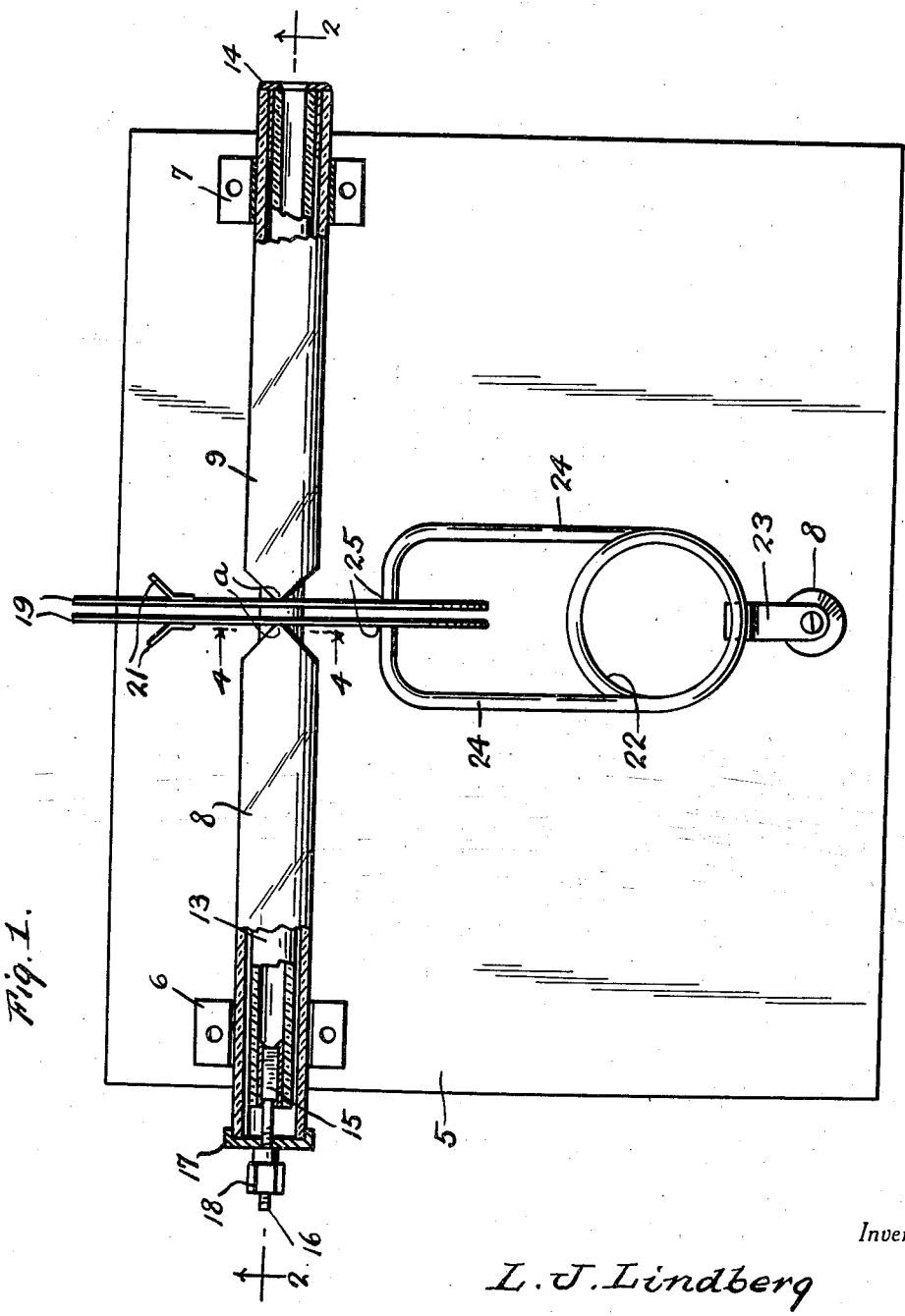
Inventor
*L. J. Lindberg*
By *Clarence A. O'Brien*
*Hyman Berman*
Attorneys Jan. 18, 1938.  LE ROY J. LINDBERG  2,106,120
HIGH FREQUENCY APPARATUS
Filed April 14, 1937   3 Sheets-Sheet 2
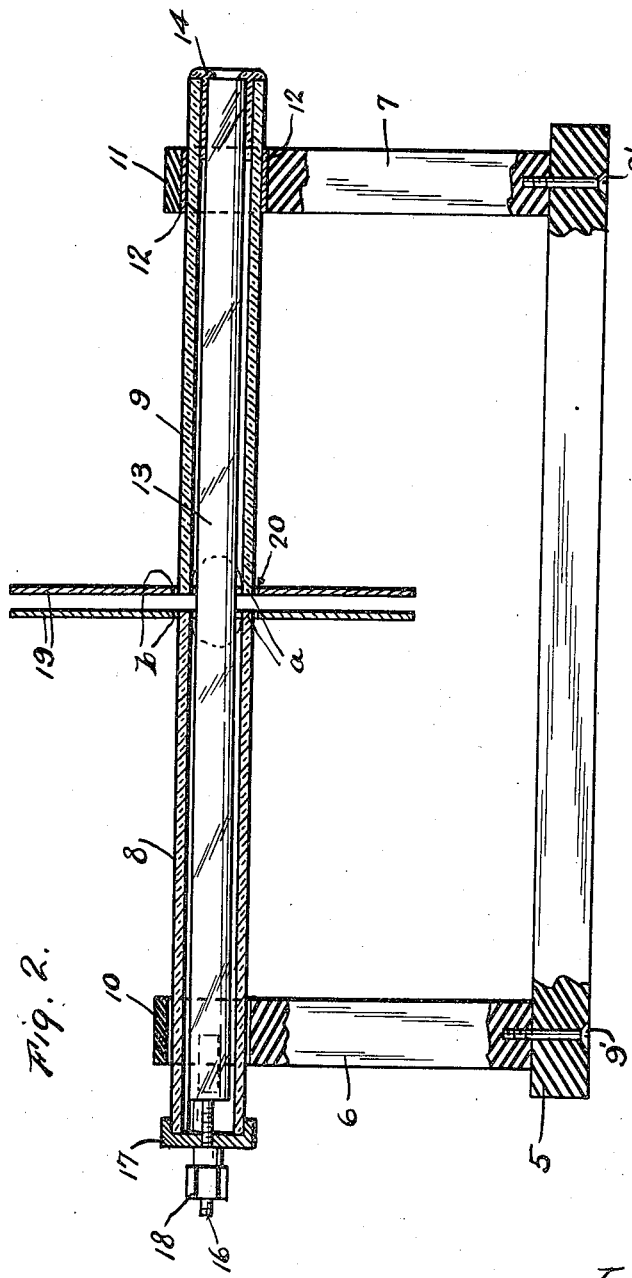
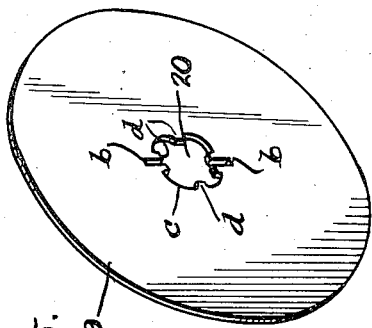
Inventor
L. J. Lindberg
By Clarence A. O'Brien
Hyman Berman
Attorneys Jan. 18, 1938.   LE ROY J. LINDBERG   2,106,120
HIGH FREQUENCY APPARATUS
Filed April 14, 1937        3 Sheets-Sheet 3
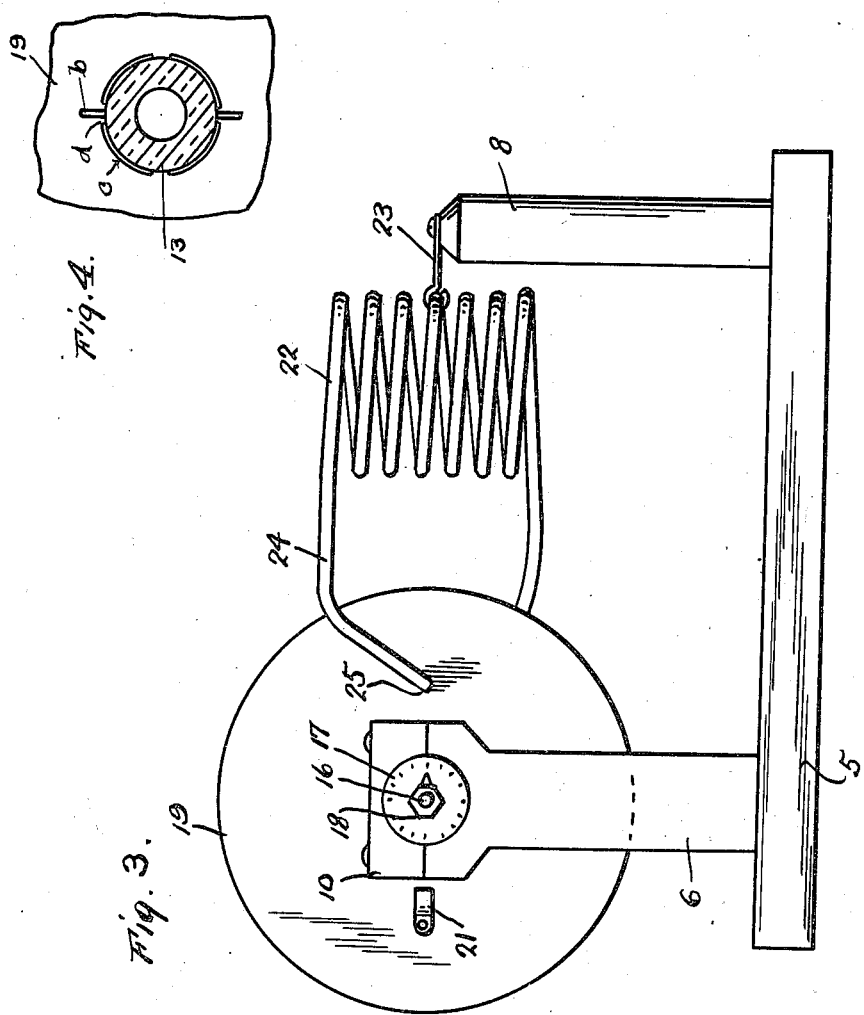
Inventor
L. J. Lindberg
By Clarence A. O'Brien
Hyman Berman
Attorneys Patented Jan. 18, 1938

2,106,120

UNITED STATES PATENT OFFICE 2,106,120

HIGH FREQUENCY APPARATUS

Le Roy John Lindberg, Glasgow, Mont.

Application April 14, 1937, Serial No. 136,930

4 Claims. (Cl. 250—40)

This invention appertains to new and useful improvements in ultra high frequency tuned circuits and more particularly to a novel apparatus for accomplishing more efficiently the purpose of such circuits.

Another important object of the invention is to provide an apparatus of the character stated which will reduce the possibility of leakage to the very lowest minimum.

Another important object of the invention is to provide a high frequency apparatus wherein the inductance coil serves as a spring tensioning element in the apparatus.

Other important objects and advantages of the invention will become apparent to the reader of the following specification.

In the drawings:

Figure 1 represents a top plan view of the apparatus with parts in section.

Figure 2 is a longitudinal sectional view taken substantially on the line 2—2 of Figure 1.

Figure 3 is a side elevational view of the apparatus.

Figure 4 is a section on the line 4—4 of Figure 1.

Figure 5 is a perspective view of one of the upper plates.

Figure 6 is a fragmentary perspective view of one of the tubes.

Referring to the drawings wherein like numerals designate like parts, it can be seen that the numeral 5 designates a base of insulation having the upstanding members 6, 7 and 8 all of insulation and secured to the base by screws 9.

The supports 6—7 support the tubes 8—9, which tubes are of glass, fused quartz, pyrex, or any other low loss material. A member 10 is secured to the top of the support 6 to define a slideway for the tube 8 and while a clamp member 11 is provided at the top of the support 7 and this in conjunction with suitable sealing material 12 serves to hold the tube 9 firmly to the support 7.

Extending longitudinally in the tubes 8—9 is the tube 13, one end of which is secured firmly to the adjacent end of the tube 9 by suitable sealing material 14, while its opposite end terminates spaced inwardly from the outer end of the tube 8.

As may be seen in Figure 1, a plug 15 is secured in the last mentioned end of the tube 13 by suitable sealing material. From this plug 15 a threaded shank 16 extends and this extends through the cap 17 on the adjacent end of the tube 8. A nut 18 is provided on the threaded shank 16 and is feedable against the cap 17. Obviously, the tube 13 is fixed to the tube 9 and the tube 9 in turn fixed to the support 7, the tube 13 cannot move and any adjustment of the nut 18 will only affect the tube 8.

The adjacent end of the tubes 8—9 are cut off on crossed diagonals to define the points $a$—$a$ for each of these ends which engage into the slits $b$—$b$ of the corresponding copper discs 19. Each of these discs is provided with a central opening 20 through which the tube 13 extends and the edge portion of the discs at the opening has cutaway portions $c$, leaving only the small bearing points for engagement with the tube 13 to further lessen any possible loss.

As shown in Figure 3, the discs 19 are provided with tap lugs 21. The points $a$—$a$ of the tube 9 engage into the adjacent disc 19 and the points of the tube 8 into the other disc 19 to steady and prevent rotation thereof.

Numeral 22 represents the vertically disposed inductance coil of spring material which is supported by a tap 23 at its intermediate convolutions extending from the support 8. The free end of this coil 22 extends to engage the outer side of one of the discs 19 and the other to engage the outer side of the other disc, these extensions 24 of the coil 22 being suitably welded as at 25 to the corresponding disc.

It can now be seen, that the coil 22 which is the inductance coil also serves as the spring for engaging the discs 19 and these discs a distance apart can be adjusted by operating the nut 18 with or against the tension of the said coil 22.

Furthermore, the entire apparatus, that is the metal parts thereof can be silver-plated and preferably so.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

1. A high frequency apparatus comprising a base, a pair of supports on the base, a pair of tubes supported by the supports in alignment and having their adjacent ends in spaced relation, a third tube extending longitudinally in the tubes and having one end portion anchored to the outer end of one of the first mentioned tubes, adjusting means between the outer end of the other of the first mentioned tubes and the remaining end of the third mentioned tube, a pair of current conductive plates between the adjacent ends of the first mentioned tubes and circumscribing the third mentioned tube and spring means for holding the said plates under contractual relation.

2. A high frequency apparatus comprising a base, a pair of supports on the base, a pair of tubes supported by the supports in alignment and having their adjacent ends in spaced relation, a third tube extending longitudinally in the tubes and having one end portion anchored to the outer end of one of the first mentioned tubes, adjusting means between the outer end of the other of the first mentioned tubes and the remaining end of the third mentioned tube, a pair of current conductive plates between the adjacent ends of the first mentioned tubes and circumscribing the third mentioned tube and spring means for holding the said plates under contractual relation, said spring means being in the form of an inductance having its ends connected to and bearing against the said plates.

3. A high frequency apparatus comprising a base, a pair of supports on the base, a pair of tubes supported by the supports in alignment and having their adjacent ends in spaced relation, a third tube extending longitudinally in the tubes and having one end portion anchored to the outer end of one of the first mentioned tubes, adjusting means between the outer end of the other of the first mentioned tubes and the remaining end of the third mentioned tube, a pair of current conductive plates between the adjacent ends of the first mentioned tubes and circumscribing the third mentioned tube and spring means for holding the said plates under contractual relation, said adjusting means consisting of a cap on the outer end of the other of the first mentioned tubes, a shank extending from the third mentioned tube through the cap and provided with a nut for riding against the said cap.

4. A high frequency apparatus comprising a base, a pair of supports on the base, a pair of tubes supported by the supports in alignment and having their adjacent ends in spaced relation, a third tube extending longitudinally in the tubes and having one end portion anchored to the outer end of one of the first mentioned tubes, adjusting means between the outer end of the other of the first mentioned tubes and the remaining end of the third mentioned tube, a pair of current conductive plates between the adjacent ends of the first mentioned tubes and circumscribing the third mentioned tube and spring means for holding the said plates under contractual relation, said plates being provided with slits therein, the inner ends of the first-mentioned tubes being cut to provide points for engagement in the slits to prevent rotation of the plates.

LE ROY JOHN LINDBERG.